(12) United States Patent
Forster

(10) Patent No.: US 7,084,539 B2
(45) Date of Patent: Aug. 1, 2006

(54) SELF-SUPPORTING DRIVE MODULE

(75) Inventor: Franz Forster, Karlstadt-Mülbach (DE)

(73) Assignee: Linde Aktiengesellschaft, Wiesbaden (DE)

( * ) Notice: Subject to any disclaimer, the term of this patent is extended or adjusted under 35 U.S.C. 154(b) by 0 days.

(21) Appl. No.: 10/927,423

(22) Filed: Aug. 26, 2004

(65) Prior Publication Data

US 2005/0082929 A1   Apr. 21, 2005

(30) Foreign Application Priority Data

Aug. 27, 2003   (DE) ................ 103 39 433

(51) Int. Cl.
*H02K 5/00* (2006.01)
(52) U.S. Cl. ........................ 310/91; 310/112
(58) Field of Classification Search ................. 310/89,
310/91, 75 R, 112, 98; 180/65.2, 65.5, 53.4–53.6,
180/307, 308; B66F 9/75, 9/20
See application file for complete search history.

(56) References Cited

U.S. PATENT DOCUMENTS

| | | | | |
|---|---|---|---|---|
| 3,567,975 A | * | 3/1971 | Biesack et al. | 310/54 |
| 4,347,907 A | | 9/1982 | Downing, Jr. | |
| 4,908,538 A | * | 3/1990 | Geberth, Jr. | 310/59 |
| 5,633,544 A | * | 5/1997 | Toida et al. | 310/67 R |
| 6,100,615 A | * | 8/2000 | Birkestrand | 310/75 C |
| 6,398,685 B1 | | 6/2002 | Wachauer et al. | |

FOREIGN PATENT DOCUMENTS

| | | |
|---|---|---|
| DE | 196 48 979 A1 | 5/1998 |
| EP | 0 587 389 A1 | 3/1994 |
| GB | 2 398 550 A | 8/2004 |
| JP | 2002-362889 A * | 10/2002 |
| WO | WO 01/03963 A1 | 1/2001 |

* cited by examiner

*Primary Examiner*—Tran Nguyen
(74) *Attorney, Agent, or Firm*—The Webb Law Firm

(57) ABSTRACT

A self-supporting drive module has a support component (1) in which at least one electric motor (2 or 3 or 6) is located. To facilitate the manufacturing process, the electric motor (2 or 3 or 6) is a prefabricated motor module having a separate motor housing (2a or 3a or 6a). The support component (1) can be a drive axle, with at least one drive wheel located on each end of the axle.

16 Claims, 1 Drawing Sheet

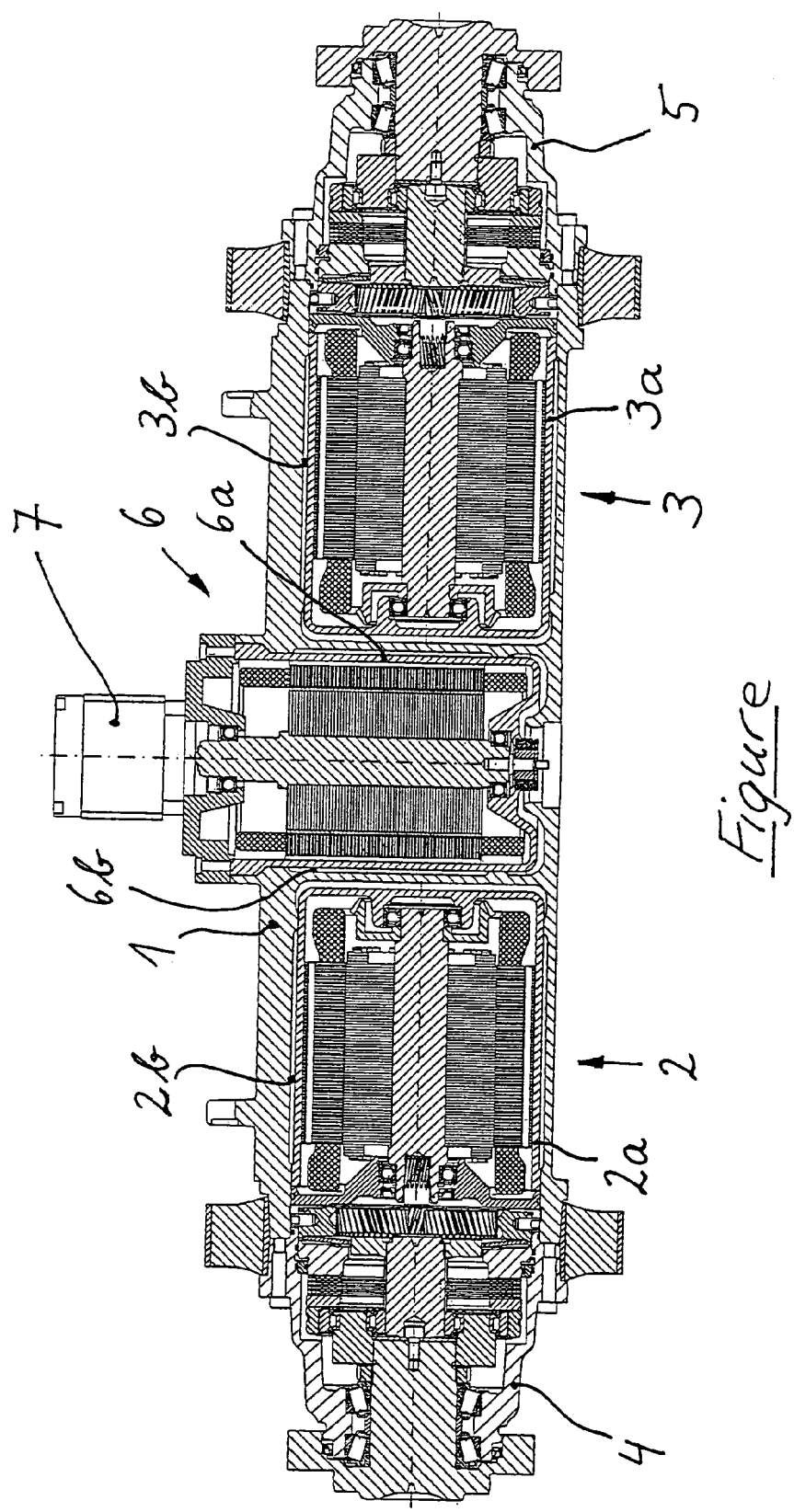
Figure

SELF-SUPPORTING DRIVE MODULE

CROSS REFERENCE TO RELATED APPLICATION

This application claims priority to German Application No. 103 39 433.8 filed Aug. 27, 2003, which is herein incorporated by reference in its entirety.

BACKGROUND OF THE INVENTION

1. Field of the Invention

This invention relates to a self-supporting drive module with a support component in which at least one electric motor is located.

2. Technical Considerations

DE 196 48 979 A1 describes a drive module that is realized in the form of a drive axle. In that case, two electric traction motors are installed in a common axle housing that absorbs forces and torques and also serves as the motor housing for the electric traction motors. The traction motors are cooled by air that is admitted through openings in the axle housing and flows into the vicinity of the rotors of the traction motors. To assemble the traction motors, the individual motor components (stator, rotor, bearing, etc.) are inserted sequentially into the axle housing and are fastened in position.

An object of this invention is to provide a drive module of the general type described above but which can be manufactured more easily.

SUMMARY OF THE INVENTION

The invention provides a drive module in which at least one electric motor is realized in the form of a prefabricated modular motor having a separate motor housing.

The drive module of the invention makes it possible to manufacture, test and store the electric motor independently of the drive module. The assembly of the electric motor with the support component to create the drive module of the invention is very simple because all that is necessary is to insert the electric motor, which is a modular motor, into the support component and fix it in position. The installation can be supplemented, if necessary, by the connection of a reducing gear and/or a brake and/or a drive unit (e.g., wheel bearing). The removal or replacement of the electric motor for service and/or repair is also easy because, in contrast to the known devices described above, it is not necessary to disassemble the electric motor.

In one embodiment of the invention, the motor housing is configured as an assembly that is relatively thin-walled and non-load-bearing with respect to forces that are exerted externally on the drive module. Because the forces that are exerted externally on the drive module are absorbed by the support component, the motor housing can be designed with significantly thinner walls than is the case with the motor housings of electric motors of the known devices. Nevertheless, the existence of a separate motor housing of the electric motor guarantees that the air gap between the rotor and the stator will not be subjected to disadvantageous changes if the support component is deformed by the load, which is a particular advantage with electric motors that have a very small air gap, e.g., asynchronous motors.

To facilitate cooling, the motor housing can be advantageously made of a material that has a relatively high thermal conductivity, such as aluminum or an aluminum alloy.

If the motor housing is in surface contact with the support component, the heat from the self-supporting drive module can be discharged particularly easily. The support component can be cooled by ambient air, which can optionally be assisted by a fan. In that case, the electric motor is cooled indirectly. An effective transmission of heat from the electric motor to the support component can be achieved by having the housing of the electric motor in surface contact over its full length with the support component.

In one advantageous embodiment of the invention, which can be used alternatively or in addition to the cooling method described above, the invention teaches that between the inside of the closed support component and the outside of the motor housing, spaces can be formed in which coolant can be located.

In the installed position, therefore, spaces can be formed in the drive module, through which the heat generated by the electric motor during operation can be effectively discharged. A suitable coolant can flow through the spaces.

With regard to optimized cooling, it is advantageous if the coolant used is a liquid, such as hydraulic fluid. Nevertheless, it is also possible to use air as the cooling medium, if care is taken that air flows in through the spaces in sufficient quantities to remove the heat generated.

In one advantageous configuration of the invention, the support component is in the form of the drive axle, with at least one drive wheel located on each end of the axle.

If there are two electric motors provided as wheel motors in the drive axle and each of them is in the form of a modular motor, an individual wheel drive is the result, in spite of the construction of the axle. Of course, a construction is also possible in which a common traction motor, downstream of which a differential is installed, drives both wheels.

In an embodiment with two wheel motors, at least one additional electric motor can be located axially between the wheel motors and can be a modular motor to drive at least one pump of a hydraulic work system and/or a steering system.

With regard to compact size, it is advantageous if the additional electric motor is oriented at a right angle to the wheel motors.

The use of the drive module of the invention realized in the form of a drive axle is especially advantageous in an industrial truck, such as a front-seat, counterweighted fork-lift truck, with a lifting assembly fastened to the drive axle.

BRIEF DESCRIPTION OF THE DRAWING

Additional advantages and details of the invention are explained in greater detail below with reference to the exemplary embodiment which is illustrated in the accompanying schematic FIGURE.

DESCRIPTION OF THE PREFERRED EMBODIMENTS

The accompanying FIGURE shows a horizontal longitudinal section through a drive module which is realized in the form of a drive axle of a fork-lift truck. The drive axle has a closed support component 1 in which are located two electric motors 2 and 3, each of which is provided for the drive of a wheel that is fastened to the end of the axle. In this exemplary embodiment, located axially between each of the electric motors 2 and 3 serving as wheel motors and the respective end of the axle are a reducing transmission, a brake, and a wheel bearing unit which are located in wheel heads 4 or 5, respectively.

Located axially between the electric motors 2 and 3, in the middle portion of the axle, is an additional electric motor 6 which is oriented at a right angle to the electric motors 2 and 3 in the support component 1. The additional electric motor 6 is coupled with a hydraulic pump 7, which is connected to a hydraulic work system and/or a steering system.

The electric motors 2, 3, and 6 can be modular motors, each of which can have a separate motor housing 2*a*, 3*a*, and 6*a*, respectively, and, therefore, can be inserted into the support component 1 in the prefabricated state (including tachometer, cable bushing, etc.) and can be fastened in position. These motors 2, 3, and 6 with motor housings 2*a*, 3*a*, 6*a* also absorb the reaction torque. In this exemplary embodiment, in the installed position, spaces 2*b*, 3*b*, and 6*b* are formed between the outside of the motor housings 2*a*, 3*a*, and 6*a*, respectively, and the inside of the support component 1. These spaces 2*b*, 3*b*, and 6*b* can be filled with coolant and can be connected to one another, such as by channels or conduits.

Ideally, the coolant can be a fluid, such as hydraulic fluid, which can be connected to an existing oil circuit, for example the above-mentioned hydraulic work system or steering system, and which can absorb heat from the drive module (axle housing) generated by the electric motors 2, 3, and 6. Of course, it is also possible to configure only the two wheel motors (electric motors 2 and 3) or only the additional electric motor 6 in the form of a modular motor. It is also possible to omit the cooling spaces if an overheating of the electric motor or motors can be prevented.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A self-supporting drive module, comprising:
   a support component; and
   at least one electric motor located in the support component, wherein the electric motor is a prefabricated modular motor having a separate motor housing, and wherein the motor housing is relatively thin-walled and non-load-bearing compared to the support component with respect to forces that are exerted externally on the drive module.

2. The self-supporting drive module as claimed in claim 1, wherein the motor housing comprises a material that has high thermal conductivity.

3. The self-supporting drive module as claimed in claim 1, wherein the motor housing comprises aluminum or an aluminum alloy.

4. The self-supporting drive module as claimed in claim 1, wherein the motor housing is in surface contact with the support component.

5. The self-supporting drive module as claimed in claim 3, wherein the motor housing is in surface contact with the support component.

6. The self-supporting drive module as claimed in claim 1, including spaces formed between the inside of the support component and the outside of the motor housing, wherein coolant is located in the spaces.

7. The self-supporting drive module as claimed in claim 3, including spaces formed between the inside of the support component and the outside of the motor housing, wherein coolant is located in the spaces.

8. The self-supporting drive module as claimed in claim 4, including spaces formed between the inside of the support component and the outside of the motor housing, wherein coolant is located in the spaces.

9. The self-supporting drive module as claimed in claim 6, wherein the coolant is a liquid.

10. The self-supporting drive module as claimed in claim 9, wherein the coolant is hydraulic fluid.

11. The self-supporting drive module as claimed in claim 1, wherein the support component is a drive axle, with a drive wheel located on each end of the drive axle.

12. The self-supporting drive module as claimed in claim 11, including two electric motors located in the drive axle as wheel motors, with each motor in the form of a motor module.

13. The self-supporting drive module as claimed in claim 12, including at least one additional electric motor located axially between the wheel motors, which additional electric motor is a modular motor and is provided for the drive of at least one hydraulic pump of a hydraulic work system and/or a steering system.

14. The self-supporting drive module as claimed in claim 13, wherein the additional electric motor is oriented at a right angle to the wheel motors.

15. The self-supporting drive module as claimed in claim 1, wherein the drive motor is located in an industrial truck.

16. The self-supporting drive module as claimed in claim 15, wherein the industrial truck is a front-seat, counter-weighted fork-lift truck having a lifting assembly fastened to a drive axle.

* * * * *